US005771967A

United States Patent [19]
Hyman

[11] Patent Number: 5,771,967
[45] Date of Patent: Jun. 30, 1998

[54] WICK-INTERRUPT TEMPERATURE CONTROLLING HEAT PIPE

[75] Inventor: Nelson L. Hyman, Randallstown, Md.

[73] Assignee: The United States of America as represented by the Secretary of the Navy, Washington, D.C.

[21] Appl. No.: 712,814

[22] Filed: Sep. 12, 1996

[51] Int. Cl.⁶ .................................................. F28D 15/00
[52] U.S. Cl. ..................... 165/274; 165/104.26; 126/45
[58] Field of Search ............................. 165/104.26, 274; 126/45, 96

[56] References Cited

U.S. PATENT DOCUMENTS

| | | | |
|---|---|---|---|
| 3,587,725 | 6/1971 | Basiulis | 165/104.26 X |
| 3,818,980 | 6/1974 | Moore, Jr. | 165/274 X |
| 4,026,348 | 5/1977 | Roberts | 165/32 |
| 4,147,206 | 4/1979 | Basiulis | 165/32 |
| 4,162,701 | 7/1979 | Ollendorf | 165/32 |
| 4,351,388 | 9/1982 | Calhoun et al. | 165/104.26 |
| 4,489,777 | 12/1984 | Del Bagno et al. | 165/104.26 |
| 5,335,720 | 8/1994 | Ogushi et al. | 165/104.26 |

FOREIGN PATENT DOCUMENTS

| | | | |
|---|---|---|---|
| 0145890 | 8/1983 | Japan | 165/104.26 |
| 0918766 | 4/1982 | U.S.S.R. | 165/104.26 |

OTHER PUBLICATIONS

Kaufman et al., Evaluation of Commercially Available Spacecraft-Type Heat Pipes, J. Spacecraft, vol. No. 2, pp.98–103, Mar. 1979.

Groll et al, Shutdown Characteristics of an Axial–Groove Liquid–Trap Heat Pipe Thermal Diode, J. Spacecraft, vol. 19, No. 2, pp. 173–178, Mar. 1982.

*Primary Examiner*—John K. Ford
*Assistant Examiner*—Christopher Atkinson
*Attorney, Agent, or Firm*—Thomas E. McDonnell; Charles Stockstill

[57] ABSTRACT

The wick-interrupt temperature controlling heat pipe (WITCH) is a device for controlling the temperature of spacecraft temperature-sensitive, heat dispensing devices. A heat transporting working fluid is conveyed in saturated equilibrium with its vapor across a discontinuous internal capillary liquid wick, within a tubular cylindrical pressure vessel, from a condenser section to an evaporator section located on either side of the discontinuity. When the temperature within the WITCH rises to a predetermined level, a sliding wick located within the internal capillary liquid wick is inserted across the discontinuity by a temperature sensitive control rod, thereby allowing the heat transporting working fluid to circulate from the condenser section wick to the evaporator section wick. In this configuration, the WITCH operates identically to the "constant-conductance heat pipe" commonly used. When the component's or heat pipe's temperature drops to a predetermined level the control rod contracts relative to the heat pipe vessel wall and retracts the sliding wick, again creating a wick discontinuity between the evaporator and condenser sections and thereby interrupting the flow of the heat transporting working fluid and causing evaporator dry-out and curtailment of heat pipe operation. This "ON" and "OFF" heat pipe operation is the means whereby temperature is actively controlled to within a narrow range while heat transport varies over a wide range.

15 Claims, 6 Drawing Sheets

SECT. A-A

WICK-INTERRUPT TEMPERATURE CONTROLLING HEAT PIPE

BACKGROUND OF THE INVENTION

1. Field of the Invention

This invention pertains generally to a device for transporting thermal energy above a predetermined temperature level and more particularly to a heat pipe that provides active temperature control for use in spacecraft thermal control subsystems.

2. Description of the Related Art

The heat pipe 10, FIG. 1, is a device widely used to transfer high rates of heat flow across large distances with negligible temperature drop, i.e., a device with inherent ultra high thermal conductance. In its simplest and most common "generic" form, it consists of a closed pressure vessel 12, in a general pipe shape, containing a working fluid 14 (liquid and vapor) in saturated thermal equilibrium. External heat is input to an evaporator section 16, and heat is rejected to an external heat sink (not shown) from a condenser section 18. The evaporator section 16 and condenser section 18 are connected by a vapor flow volume and an internal capillary wick 22. A working fluid 14, such as ammonia, absorbs its phase-change "heat of vaporization" as it evaporates in the evaporator section 16, flows to the condenser section 18, as shown by dashed arrows 21, and condenses, giving up that heat to the heat pipe 12 walls. The working fluid then returns in liquid form to the evaporator section 16 via capillary pumping within the wick 22. The most common heat pipe material is aluminum because it is readily-extruded so as to have integral wicks of fine channels in the wall.

The generic heat pipe 10 described above is passive; i.e., its conductance is essentially constant, with no features to modulate conductance to "actively" control temperature. Other forms of the heat pipe have features that provide active temperature control or diode action. The most widely used form of an "active control" heat pipe 20, FIG. 2, is termed the "variable conductance heat pipe" (VCHP). The VCHP relies on a contained volume of non-condensing gas (NCG) 29 to displace a controlled portion of the working fluid 14 in the condenser 18, rendering that portion of the condenser 18 containing the working fluid 14 thermally inactive. The NCG is stored in a reservoir 28 (NCGR) connected to the condenser-end, and is partially displaced from the reservoir 28 into the condenser 18 when heated by an electrical heater 32 on the reservoir 28 wall. The volume of the NCG is a function primarily of the reservoir 28 temperature, and a thermostat, or temperature sensor 34, on the evaporator 16 controls the NCGR heater 32 operation and thus the evaporator 16 temperature. This VCHP 20 works quite well, is reliable and predictable, but there are several shortcomings which this invention addresses directly. NCGR 28 volume is proportional to VCHP 20 condenser 18 length; thus condenser 18 length is usually limited by volume, mass, and heater 32 power restrictions associated with the NCGR 28, and not defined by actual condenser 18 length requirements based on required radiator area. Usually, a fixed-conductance heat pipe (FCHP) is used to isothermalize a radiator, with the VCHP 20 condenser 18 thermally coupled to the FCHP evaporator 36. This is considered an unwelcome added thermal resistance and temperature drop from VCHP 20 condenser-to-FCHP evaporator 16. The required external heater 32, temperature-controlled switch (electronic or mechanical), and heater 32 electric power represent a VCHP 20 reliability "weak link." The VCHP 20 can not function as an active temperature controller without these external devices and power source, and thus can be considered "non-autonomous", with its overall long-life reliability defined by its weak-link "externals."

Almost all VCHPs 20 operate with a condenser 18 length turn-off proportional to evaporator 16 temperature. With a temperature sensor on the evaporator 16 electronically controlling the NCGR 28 temperature by modulating heater 32 power to the NCGR 28 walls, the VCHP condenser 18 is capable of a full 0 to 100% effectiveness range corresponding to a narrow evaporator temperature band, on the order of 1° or 2° C.

SUMMARY OF THE INVENTION

The object of this invention is to provide a device for the active temperature control of spacecraft heat generating equipment.

Another object of the invention is to provide an active temperature control device having low mass, high reliability and no need for external temperature sensors or heaters.

These and other objectives are obtained with the wick-interrupt temperature controlling heat pipe (WITCH). An internal capillary liquid wick, with a controllable discontinuity is located within a tubular closed pressure vessel, allows a heat conveying working fluid, in saturated thermal equilibrium, to be transported from a condenser section wick to an evaporator section wick by capillary action. With the temperature of the heat pipe approximately that of the heat-generating equipment, above a predetermined level, the wick is continuous and the WITCH performs similarly to the familiar, widely used, constant-conductance heat pipe. When the WITCH temperature drops to a predetermined level, a control rod contracts relative to the internal capillary liquid wick wall due to differences in material coefficients of thermal expansion causing a separate, sliding portion, of the wick to move relative to the stationary portion which creates a gap in the wick over which the working fluid cannot be capillarily pumped. The working fluid remaining in the evaporator section of the wick is evaporated and transported to the condenser section of the wick where it is stored, drying out the evaporator; WITCH heat transport thus ceases, tending to inhibit further temperature drop.

DESCRIPTION OF THE PREFERRED EMBODIMENTS

Figure 1:
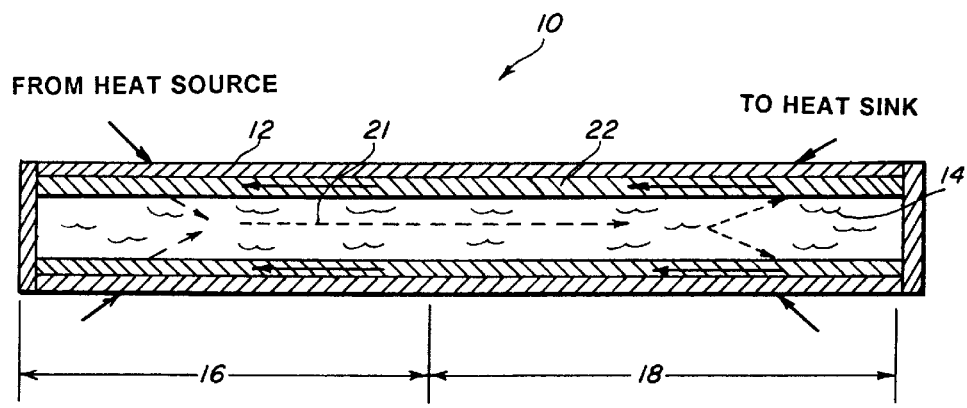
FIG. 1 shows a generic form of a heat pipe.
Figure 2:
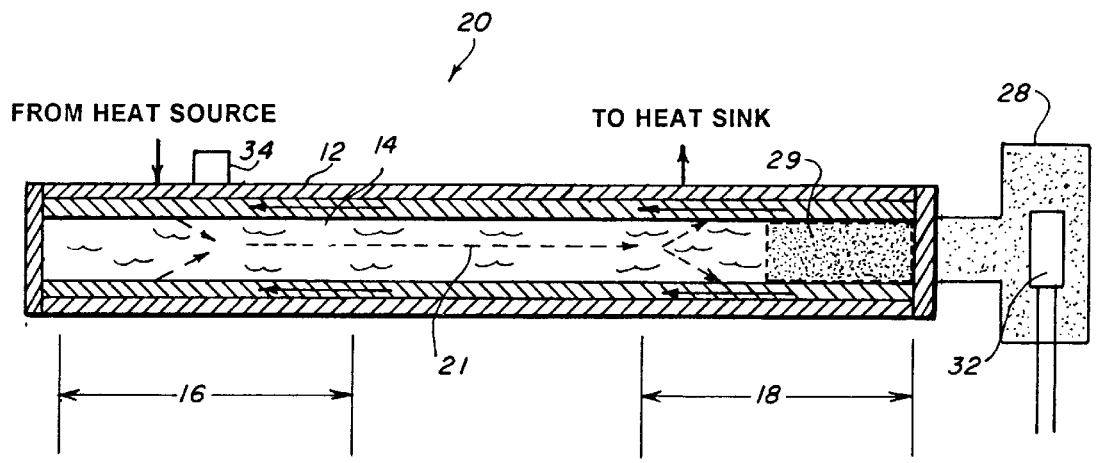
FIG. 2 shows a variable conductance heat pipe.
Figure 3:
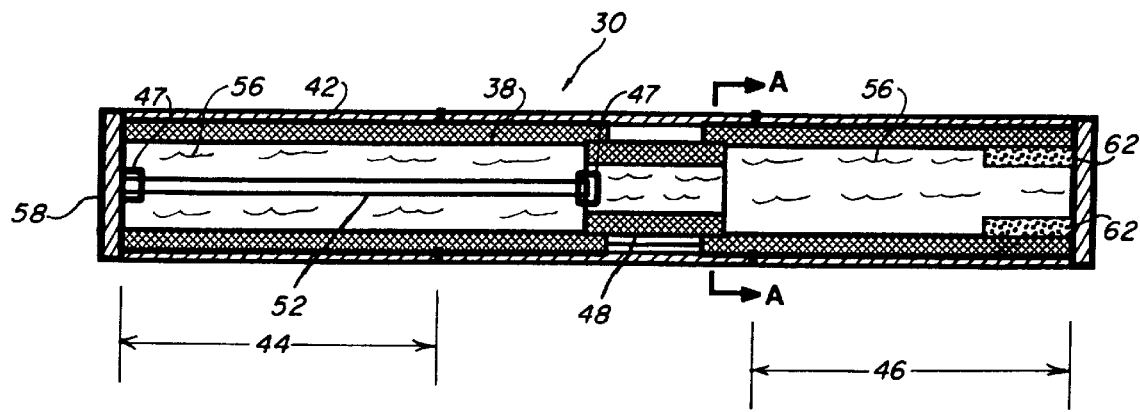
FIG. 3 shows a wick-interrupt temperature controlled heat pipe in the "ON" condition.

The wick-interrupt temperature controlled heat pipe (WITCH) 30, FIG. 3, is a heat pipe providing active temperature control of its evaporator 44 section; i.e., it is able to maintain an evaporator 44 temperature within a small range, approximately 10° C., while condenser 46 environment and evaporator 44 heat loads vary substantially. The evaporator 44 section of the WITCH 30 provides heat transmission from, or is a "heat sink" for, heat sources to be temperature-controlled. A specific evaporator 44 operating temperature range is provided by individual adjustment of an internal adjusting element 47 prior to WITCH 30 final assembly, as described below. The temperature control for the WITCH 30 is autonomous; i.e., there are no external devices or inputs to the WITCH 30 required to assist in the control of the temperature.

Basic construction and operation of the WITCH 30, FIG. 3, is similar to that shown in the prior art; however, this invention provides a device for the active control of the heat transfer and thus operating temperature of the heat pipe. This feature is an internal capillary liquid wick, or wall wick, 38, integral with a tube-shaped closed pressure vessel, or heat pipe wall, 42, having a discontinuity between the condenser 46 section and evaporator 44 section. A sliding wick 48 selectively bridges the discontinuity to provide a controllable flow of a heat transporting working fluid, or working fluid, 56. Such a discontinuity and bridging device are not found in the prior art.

Figure 5:
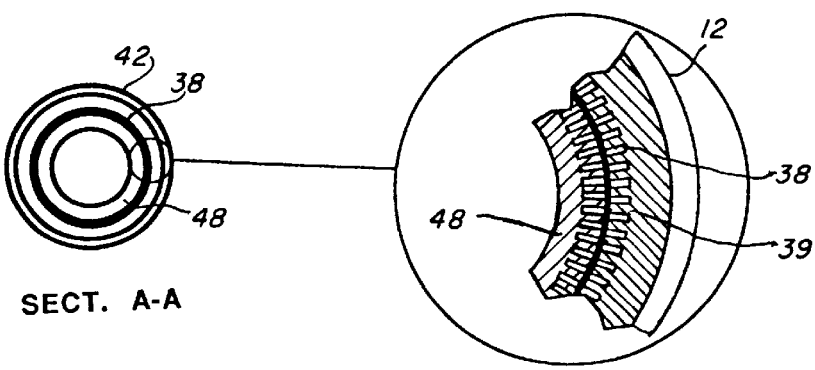
FIG. 5 shows a cross-section of a wick-interrupt temperature controlled heat pipe through A—A of FIG. 3.

The most common wick 38 geometry used in contemporary aluminum-ammonia heat pipes is shown in cross-section AA FIG. 5, and consists of narrow, deep axial grooves 39, or narrow passages, on the inner diameter of an extruded aluminum tubing. A typical groove geometry is 0.50 to 0.75 mm wide by 1.0 to 1.5 mm deep. The discontinuity in the wall wick 38 is created by machining away a segment of grooving 39, leaving a bare smooth pipe wall. Under operating conditions, i.e., when the WITCH 30 is "ON", continuity between the evaporator section wick 44 and the condenser section wick 46 is maintained by the sliding wick 48.

The sliding wick 48 is a cylinder whose external surface is of the same general extruded wick geometry as the internal surface of the wall wick 38 proper, as shown in section A—A, FIG. 5, with the axial grooves on the outer diameter. The fit of the sliding wick 48 within the wall wick 38, i.e., the relation between the outside diameter of the sliding wick 48 and the inside diameter of the wall wick 38, is such that sufficient metal-to-metal contact-plus-gap is realized for a continuous wick-to-wick capillary contact. This sliding-to-fixed wick contact can be termed a "loose sliding fit" with an actual metal-to-metal gap of approximately 0.1 to 0.2 mm on the diameter. Thus a minimal force is required to move the sliding wick 48 longitudinally. The sliding wick 48 "bridges the gap" over the wall wick 38 discontinuity when it is "centered", or in the bridging position, as shown in the "ON" position of FIG. 3, thus enabling the working fluid 56 (typically ammonia) to flow by capillary action from the condenser 46 section to the evaporator 44 section through the narrow passages in the wall wick 38 and sliding wick 48.

Figure 4:
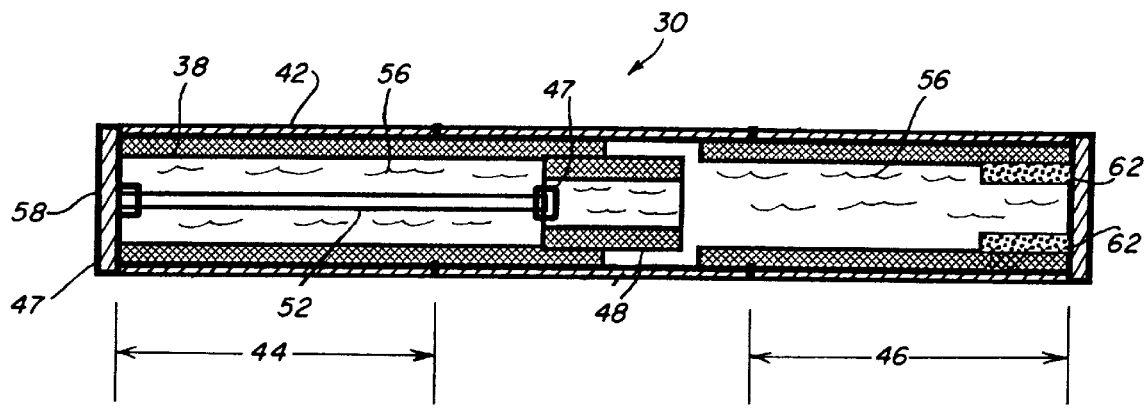
FIG. 4 shows a wick-interrupt temperature controlled heat pipe in the "OFF" condition.

When the sliding wick 48 is displaced to the "OFF" position, as shown in FIG. 4, the continuity of the wall wick 38 is interrupted to the extent that the flow of the working fluid 56 from the condenser 46 section to the evaporator 44 section ceases.

The mechanism for displacing the sliding wick 48 between the "ON" and "OFF" positions, is a control rod 52. The control rod 52 passes through the evaporator 44 section and is attached by an adjusting elements 47 located at an end wall 58 of the closed pressure vessel 42 and at the sliding wick 48. The control rod 52 material must be compatible with the working fluid 56, i.e., ammonia, and temperature environment within the WITCH 30, and have the property of a high coefficient of thermal expansion (CTE) relative to that of the wall material, in this instance aluminum. Further, the control rod 52 material must have mechanical properties sufficient for surviving a vibration/shock environment and the "pushing and pulling" of the sliding wick 48. A material such as polypropolene, with a CTE=300×10$^{-6}$/°C., has been found to meet these requirements; however, any suitable material having a similar CTE is satisfactory. The temperature of the control rod 52 must closely match that of the temperature to be actively controlled in the evaporator 44 section. Generally, it is recognized that since the control rod 52 is completely surrounded by the evaporator 44 walls and each of its ends is attached to evaporator 44 metal, the required temperature match is realized.

The movement of the sliding wick 48 relative to the walls of the wall wick 38 is a function of the difference between the CTEs of the heat pipe wall 38 proper and the control rod 52, their temperature change, $\Delta T$, and the length of the control rod 52. The relative displacement is expressed as $$RD = \Delta CTE \cdot \Delta T \cdot L$$

where RD is the relative displacement, $\Delta CTE$ is the difference in coefficients of thermal expansion of the heat pipe wall and control rod materials, $\Delta T$ is the difference in temperature over which the relative displacement occurs (typically of interest, between the "ON" and "OFF" temperatures), and L is the length of the control rod 52.

As the temperature rises, the control rod 52 length increases at a higher rate than that of the heat pipe wall 42, and the sliding wick 48 is "pushed" to the right, thereby allowing the sliding wick 48 to make capillary contact with the condenser 46 section of the wall wick 38. This contact is made at the temperature $T_h$, the evaporator 44 section temperature beyond which the heat pipe 30 is intended to function in the "ON" mode, as shown in FIG. 3.

As the temperature falls, the control rod 52 length decreases at a higher rate than that of the heat pipe wall 42, and the sliding wick 48 is displaced to the left, as shown in FIG. 4, thereby causing the sliding wick 48 to break capillary contact with the condenser 46 section wall wick 38. This contact is broken at the temperature, $T_c$, the minimum desired evaporator temperature, at which the evaporator 44 portion of the wall wick 38 begins to dry out and the heat pipe 30 begins to shut down. When sufficient thermal energy is input to the evaporator 44 to completely dry out the working fluid 56 at temperatures equal to or below $T_c$, the WITCH 30 is in its "OFF" mode, and there is no heat transport via working fluid 56 evaporation, vapor flow, and condensation.

The adjusting element 47 is located at either, or both, ends of the control rod 52, serving as the attachment to either, or both, the end wall 58 and the sliding wick 48. By means of simple rotation of screw threads within the adjusting element 47, the effective length of the control rod 52 is adjusted at the time of WITCH 30 final assembly such that the correct "discontinuity gap" is created between the sliding wick 48 and the wall wick 38 at the beginning of the condenser 46 section while the entire WITCH 30 is at the temperature $T_c$.

The working fluid 56 accumulates in the condenser 46 in the "OFF" mode as the evaporator 44 section gives up its fluid 56 via evaporation followed by its condensation in the condenser 46 section. There is adequate wick material in the condenser 46 section to contain the entire working fluid 56 inventory during the "OFF" mode. The auxiliary wick 62, at the end of the condenser 46 section, can be of any common wick material and geometry, metal or non-metal, in contact with the wall wick 38 The condenser 46 section of the wall wick 38 and the auxiliary wick 62, which are partially fluid-filled during the "ON" mode, are sized to be saturated with working fluid 56 during the "OFF" mode, to contain the entire fluid charge.

Thus the temperature of the evaporator 44 is "controlled" between $T_c$ and $T_h$, since below $T_c$ the WITCH 30 is in a low conductance "OFF" mode, thermally isolating the evaporator 44 from the condenser 46, and above $T_h$ the WITCH 30 is a fully functioning heat pipe 30, thermally connecting evaporator 44 to condenser 46 with ultra low resistance.

NUMERICAL EXAMPLE

L=1.0 m (representative length of heat pipe evaporator)
$T_h - T_c$=10 ° C. (arbitrarily chosen, but this is typical)

CTE = 300 × $10^{-6}$/°C. for control rod (polyethylene)
 = 22 × $10^{-6}$/°C. for heat pipe (aluminum)
from which RD = ΔCTE ($T_h - T_c$) (L)
 = 278 × $10^{-6}$ × 10 × 1000 mm
 = 2.78 mm (0.11 inch)

A separation of 2.78 mm between the sliding wick 48 to the condenser 46 portion of the wall wick 38 is entirely adequate for wall wick 38 interruption; i.e., ammonia will not capillarily "wick" across such a gap on a bare smooth aluminum surface in the absence of gravity forces, as found in a spacecraft application.

Depending on the geometry of the wall wick 38, control rod 52 material, and evaporator 44 length, the WITCH 30 can go from "ON" to "OFF" within a reasonably narrow temperature band such as the 10° C. of the above example.

The WITCH 30 condenser 46 length can cover any size radiator in a "one-piece" device; there is no mass or temperature-drop penalty associated with the constant-conductance heat pipe required to thermally connect a VCHP condenser to a "large" radiator. The WITCH 30 requires for operation neither non-condensable gas (NCG), non-condensable gas reservoir (NCGR), heater power, temperature sensor, nor thermostat, as required in the conventional VCHP active temperature control heat pipe. Therefore, a WITCH 30 of equal heat transport and temperature control performance will be lighter overall, with potentially higher reliability, because the WITCH 30, by comparison to other active-control devices, requires no autonomous active temperature control devices, no external appendages, connectors, or heater power, and performs according to predetermined setting for "ON" and "OFF" temperatures regardless of external thermal, electrical, or mechanical environment.

The forgoing described preferred embodiment describes a specific heat pipe construction and material. Heat pipe material is most often aluminum due to weight and cost considerations and the ease of providing an effective and rugged extruded, integral wall wick, but an all-steel WITCH 30 will function thermally as described above. The geometry of the control rod 52, as shown in FIGS. 3 and 4, is depicted as a simple rod, but it may be any other means for connecting the endplate 58 of the closed pressure wall 42 to the sliding wick 48, including a non-circular cross-section for increased stiffness. A cylindrical sliding wick 48, as shown in FIGS. 3 and 4, can be of larger surface area for a closer temperature match to that portion of the wick wall 38 surrounding the evaporator 44, and it must be provided with flow-through openings or perforations to allow unrestricted vapor flow from the evaporator 44 to the condenser 46.

Figure 6:
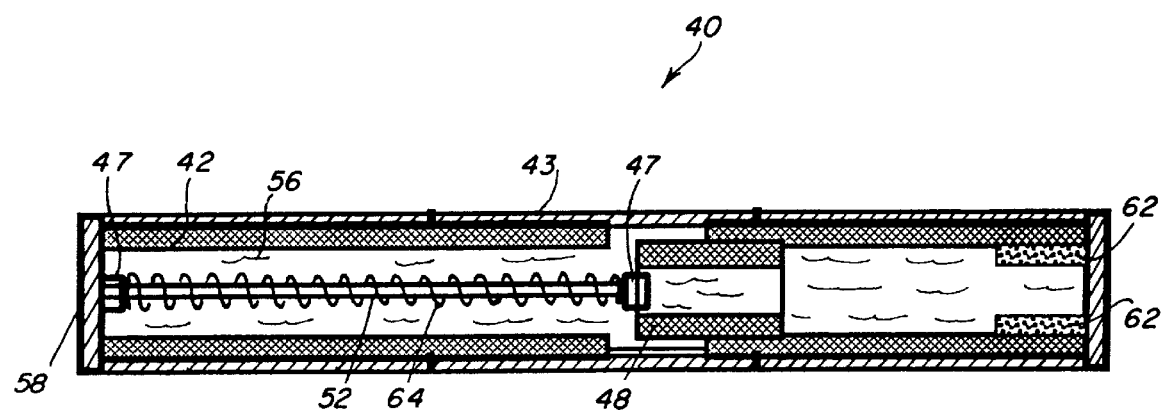
FIG. 6 shows a wick-interrupt temperature controlled heat pipe having a helical spring wrapped around the shape memory alloy (SMA) control rod.

Another preferred embodiment of the WITCH 40 is depicted in FIG. 6, similar to that described above but having a control rod 52 of shape memory alloy (SMA) inserted within a helical spring 64 which is in compression between, and bearing against, the sliding wick 48 and endplate 58. The purpose of the helical spring 64 is to provide a tension stress within the control rod 52 which results in an appropriate strain when temperature conditions and SMA behavior allow, as explained below. The helical spring 64 is made of a metal spring material compatible with the ammonia environment, such as ChrSi music wire, and of a geometry and spring rate suitable to maintain the control rod 52 at a suitable tension stress level, for example less than 15,000 psi.

Figure 7:
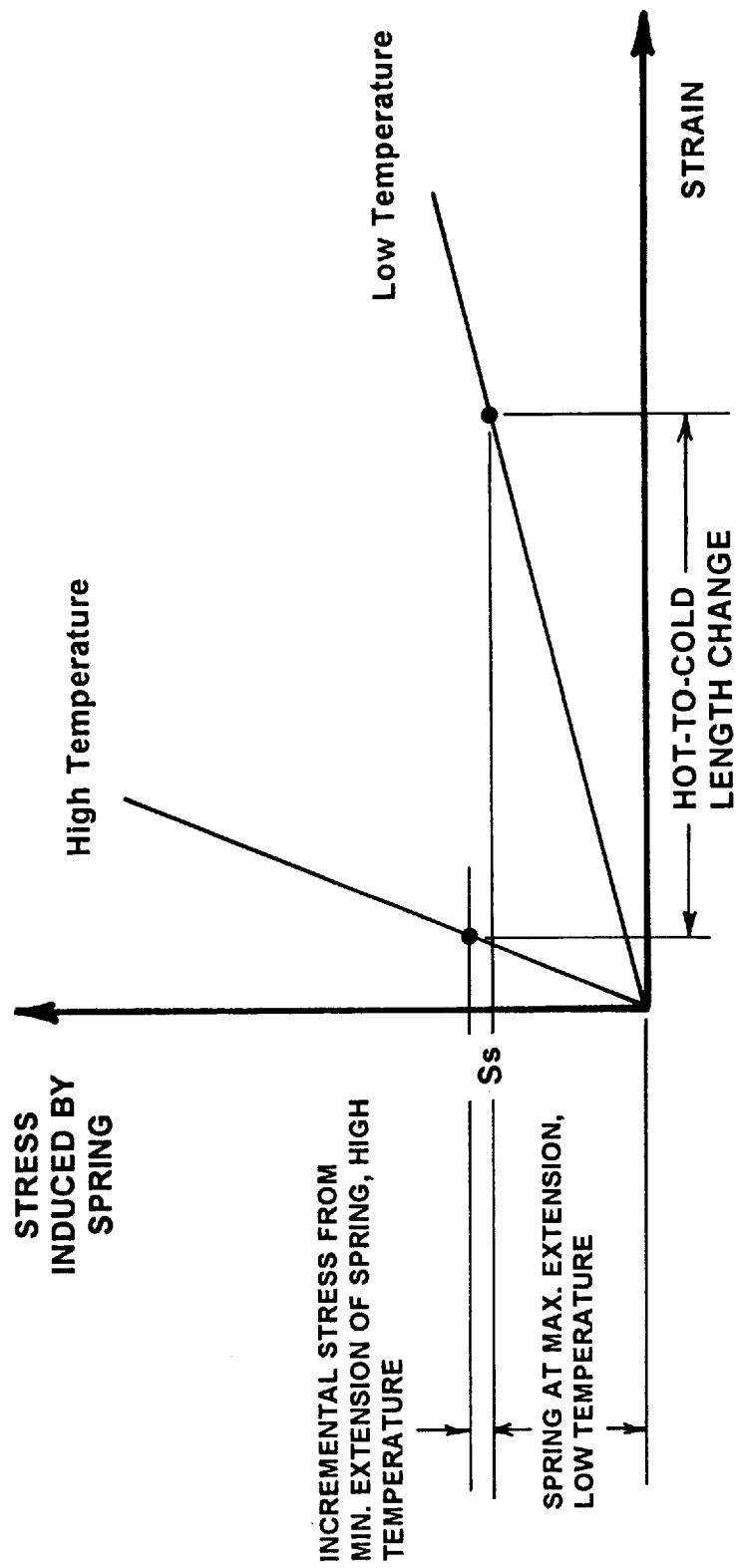
FIG. 7 shows the stress-strain diagram for high and low temperatures within the wick-interrupt temperature controlled heat pipe having a helical spring wrapped around the shape memory alloy (SMA) control rod.
Figure 8:
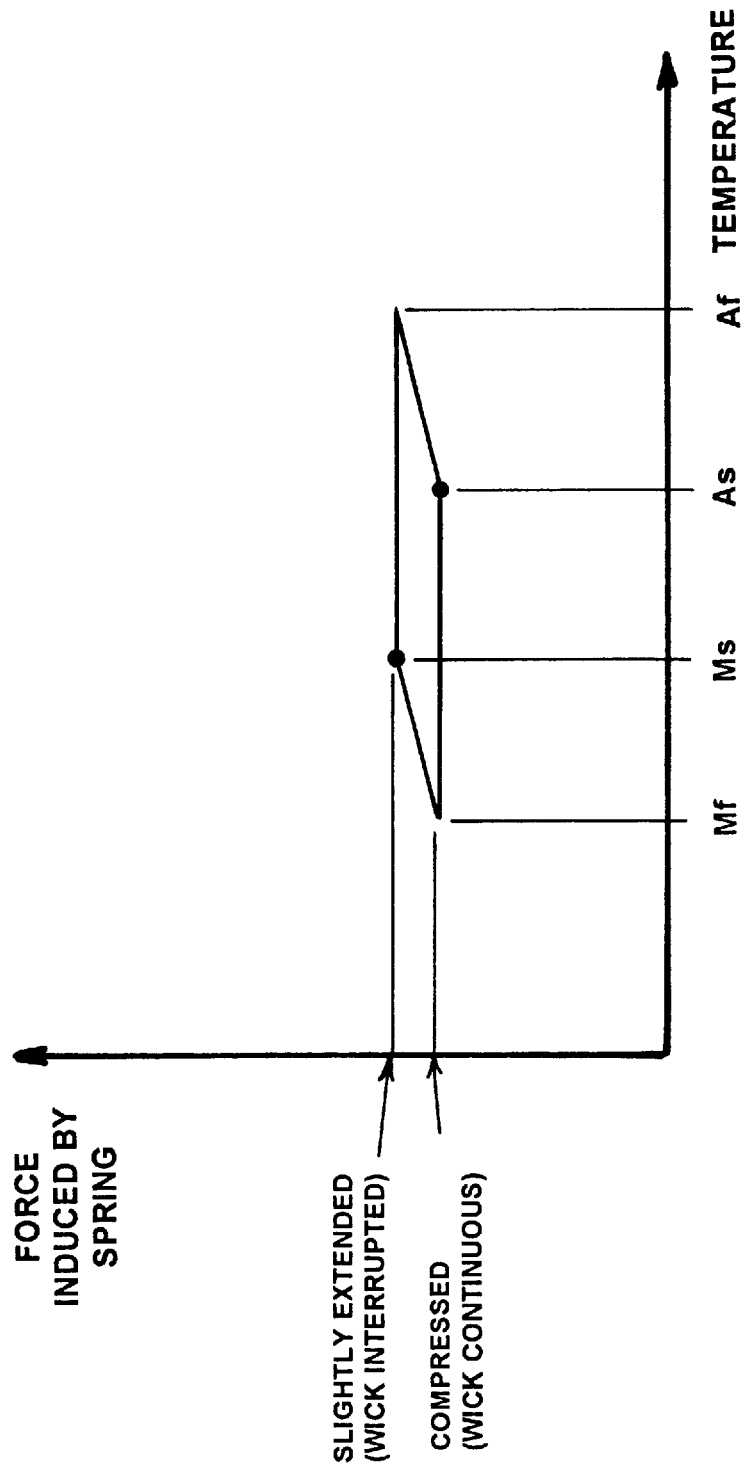
FIG. 8 is a diagram of the tensile force versus temperature within the wick-interrupt temperature controlled heat pipe having a helical spring wrapped around the shape memory alloy (SMA) control rod.

The functioning of the WITCH 40 SMA control rod 52 is based on the variation in SMA stiffness (modulus of elasticity) between low and high temperatures; for example, between approximately 10° to 30° C., or between its martensitic and austenitic conditions. The thermal-mechanical characteristics of a typical SMA control rod 52 is depicted in FIG. 7 where the variance in modulus of elasticity for the SMA control rod 52 is shown by the relationship between stress and strain at the low and high temperatures. The relationship between control rod 52 tensile force and temperature is shown in FIG. 8, where M is the martensitic range, A is the austenitic range, s is start, and f is finish. Since near zero force is required to move the sliding wick 48, the only force which the SMA control rod 52 must overcome, as it decreases in length with rising temperature and displaces the sliding wick 48 to the left, is nearly constant force from the spring 64 in compression. There are no numerical scales assigned to the plots of FIGS. 7 and 8 as the temperatures are selected for particular application requirements, and forces will correspond to particular alloys and geometries of the SMA control rod 52 and spring 64 to result in SMA control rod 52 strains of 2 to 3%, which is accepted as good SMA design practice.

The relatively large 2 to 3% strain of the SMA control rod 52 (between "cold-off" and "hot-on" temperatures) is the desirable feature of this embodiment. For a typical SMA control rod 52 length of one meter, the movement of the sliding wick 48 relative to the wall wick 38 would be 2 to 3 cm., an order of magnitude greater than that cited in the foregoing numerical example based on a control rod 52 of relatively high CTE material. This large magnitude of sliding wick 48 movement translates to a lower requirement of dimensional tolerances for the SMA control rod 52 and the sliding wick 48, together with a more positive interruption of the fluid-carrying wick 38.

Figure 9:
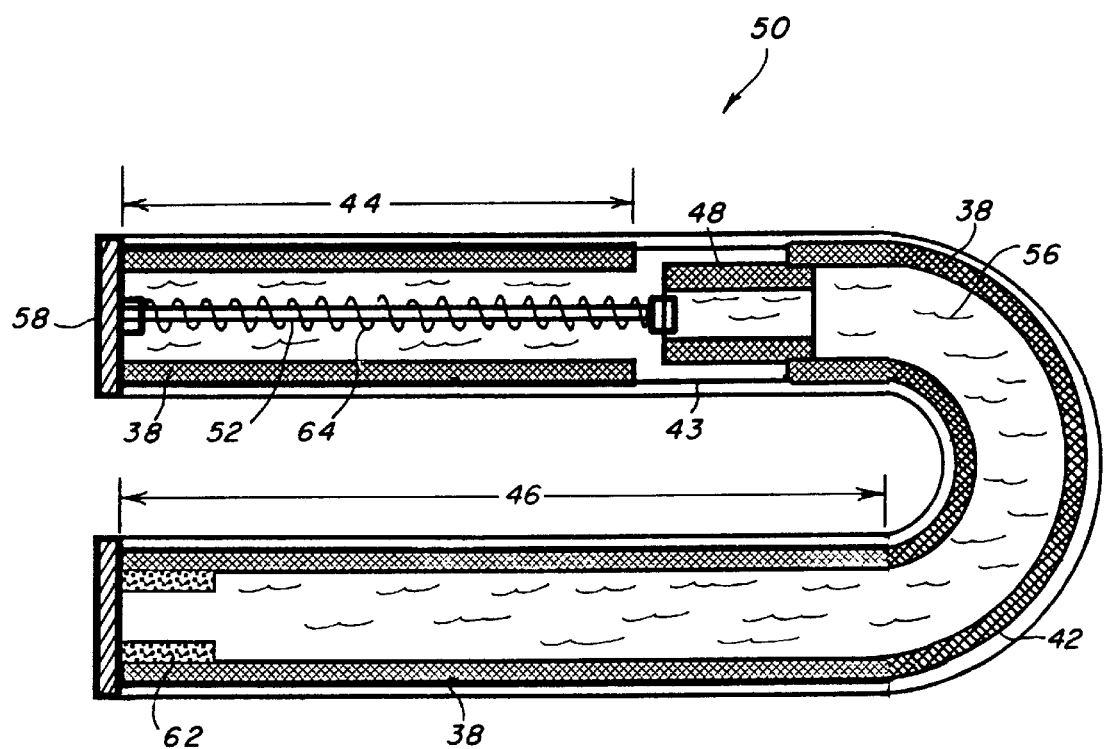
FIG. 9 shows a wick-interrupt temperature controlled heat pipe for use in a spacecraft where the heat source and heat sink lie one atop the other.

Another preferred embodiment of the WITCH 50, FIG. 9, relates to the relative geometries of the condenser 46 and evaporator 44 portions of the WITCH 50. Some applications of this invention pertain to a heat source (into the evaporator 44) and a heat sink (receiving heat from the condenser 46) which, for compelling spacecraft design reasons, lie one atop the other. This is accomplished with a 180° bend, or serpentine configuration, in the WITCH 50 starting somewhat on the condenser 46 side of the sliding wick 48. The operation of the wick interruption mechanism and the performance of the WITCH 50 are as previously described.

Although the invention has been described in relation to a specific embodiment thereof, it will be understood by those skilled in the art that still other variations and modifications can be affected in the preferred embodiment without detracting from the scope and spirit of the invention as described by the claims.

What is claimed is:

1. An active control heat pipe comprised of:
   an internal capillary liquid wick having an evaporator section separated from a condenser section by a discontinuity; and
   means for selectively connecting and disconnecting the evaporator section and condenser section at predetermined temperatures.

2. An active control heat pipe comprised of:
   an internal capillary liquid wick having an evaporator and condenser section separated by a discontinuity;
   means for absorbing heat in the evaporator section and rejecting heat from the condenser section;
   means for selectively connecting and disconnecting the evaporator section and condenser section across the discontinuity at a first and a second predetermined temperature, respectively, so as to control the flow of the absorbing means from the condenser section to the evaporator section; and
   means for selectively controlling the means for selectively connecting and disconnecting.

3. A heat pipe, as in claim 2, wherein the means for selectively connecting and disconnecting the evaporator section and the condenser section across the discontinuity is a sliding wick, said sliding wick having an inner and outer surface.

4. A heat pipe, as in claim 3, wherein the internal capillary liquid wick is further comprised of passages located on the inner surface and the sliding wick is further comprised of passages located on the outer surface, said passages circulating by capillary action the absorbing means from the condenser section to the evaporator section when the sliding wick is selectively connected across the discontinuity.

5. A heat pipe, as in claim 3, wherein the means for selectively controlling the connecting and disconnecting the evaporator section wick and the condenser section wick of the internal capillary liquid wick is a control rod;
   said control rod connected to the first end of the closed pressure vessel and at the opposing end to the sliding wick; and
   said control rod relative length expanding at a first predetermined temperature thereby causing the sliding wick to connect the evaporator section to the condenser section and said control rod's relative length contracting at a second predetermined temperature thereby causing the sliding wick to disconnect the evaporator section wick from the condenser section wick.

6. A heat pipe, as in claim 5, wherein the control rod is further comprised of a material with a high coefficient of thermal expansion and a helical spring wound around the control rod said control rod at a first end bearing against the first end of the closed pressure vessel and said control rod at a second end bearing against the sliding wick so as to maintain a preselected level of tensile stress within said control rod.

7. A heat pipe, as in claim 2, wherein the internal capillary liquid wick is straight.

8. A heat pipe, as in claim 2, wherein the internal capillary liquid wick is serpentine.

9. An active control heat pipe comprised of:
   a closed pressure vessel having a first and second end and an inner and outer wall surface;
   a tubular internal capillary liquid wick having an inner and outer surface, an evaporator section, and a condenser section, said evaporator section wick and condenser section being separated by a discontinuity;
   said internal capillary liquid wick being located within the inner surface of the closed pressure vessel and passages located on the inner surface,
   a sliding wick located within the inner surface of the internal capillary liquid wick at the discontinuity for connecting the evaporator section to the condenser section across the discontinuity at a first predetermined temperature and disconnecting the evaporator section from the condenser section at a second predetermined temperature, said sliding wick having passages located on an outer surface;
   a control rod that expands in length relative to the closed pressure vessel causing the sliding wick to connect the condenser section and the evaporator section at said first predetermined temperature and contracts at said second predetermined temperatures, thereby disconnecting the evaporator section from the condenser section, said control rod being attached to the closed pressure vessel at first end and to the sliding wick at a second end; and
   a heat transporting working fluid, in saturated thermal equilibrium, whose vapor conveys heat absorbed in the evaporator section to the condenser section when the sliding wick connects the evaporator section to the condenser section, said fluid being returned by capillary action from the condenser section to the evaporator section through the passages in the internal capillary liquid wick and sliding wick, said heat transporting working fluid ceasing to flow when the sliding wick is disconnected from either the evaporator section or from the condenser section.

10. A heat pipe, as in claim 9, wherein the control rod is a plastic material.

11. A heat pipe, as in claim 9, wherein the control rod is a shape memory alloy.

12. A heat pipe, as in claim 11, wherein the control rod is a nickel-titanium-copper alloy.

13. An active control heat pipe comprised of:
    a tubular metallic closed pressure vessel having a first and second end and an inner and outer surface;
    a tubular metallic internal capillary liquid wick having passages located on an inner surface, an evaporator section wick where heat is absorbed, and a condenser section wick where heat is rejected to an external heat sink, said evaporator section wick and condenser section wick being separated by a discontinuity;
    said internal capillary liquid wick being located within the inner surface of the closed pressure vessel;
    a tubular metallic sliding wick located within the inner surface of the internal capillary liquid wick at the discontinuity for connecting the evaporator section wick to the condenser section wick across the discontinuity at a first predetermined temperature and disconnecting the evaporator section wick from the condenser section wick at a second predetermined temperature, said sliding wick having capillary passages located on an outer surface;
    a control rod having a coefficient of thermal expansion ranging from 200° to $300 \times 10^{-6}$/°C. that expands in length relative to the metallic internal capillary wick causing the sliding wick to connect the condenser section wick and the evaporator section wick at said first predetermined temperature, and contracts in length relative to the metallic internal capillary wick at said second predetermined temperatures, thereby disconnecting the evaporator section wick from the condenser section wick, said control rod being attached to the closed pressure vessel at first end and to the sliding wick at a second end; and ammonia in saturated thermal equilibrium whose vapor conveys heat absorbed in the evaporator section wick to the condenser section wick when the sliding wick connects the evaporator section wick to the condenser section wick, said ammonia being returned by capillary action from the condenser section wick to the evaporator section wick through the passages in the internal capillary liquid wick and sliding wick, said ammonia ceasing to flow when the sliding wick is disconnected from either the evaporator section wick or from the condenser section wick.

14. A method for actively controlling the temperature of a heat pipe having an evaporator and condenser section separated by a discontinuity, comprising the steps of:

connecting and disconnecting, selectively, the evaporator and condenser sections by inserting and withdrawing a moving wick across a discontinuity in the heat pipe at a first and a second predetermined temperature, respectively; and controlling the insertion and withdrawal of the moving wick so as to control the flow of a heat transfer medium from the condenser section to the evaporator section.

15. A method for actively controlling the temperature of a heat pipe comprising the steps of:

absorbing heat in an evaporator section wick and rejecting heat from a condenser section wick of an internal capillary liquid wick by the use of a heat transport working fluid, said evaporator section wick being separated from said condenser section wick by a discontinuity;

connecting the evaporator section wick to the condenser section wick across the discontinuity in the internal capillary liquid wick so as to cause the heat transport working fluid to flow from the evaporator section wick to the condenser section wick at a first predetermined temperature;

disconnecting the evaporator section wick from the condenser section wick across the discontinuity in the internal capillary liquid wick so as to cause the heat transporting working fluid to cease flowing from the condenser section wick to the evaporator section wick at a second predetermined temperature; and circulating the heat transport working fluid from the evaporator section wick to the condenser section wick by capillary action;

selectively controlling the steps of selectively connecting and disconnecting the evaporator section wick from the condenser section wick by causing a temperature responsive control rod to insert and withdraw a sliding wick from across the discontinuity in the internal capillary liquid wick at the first and second preselected temperatures, respectively.

* * * * *